US010378264B2

(12) United States Patent
Suzuki et al.

(10) Patent No.: US 10,378,264 B2
(45) Date of Patent: Aug. 13, 2019

(54) DRIVE MOTOR FOR OPENING AND CLOSING BODY

(71) Applicant: DENSO CORPORATION, Kariya-shi, Aichi-ken (JP)

(72) Inventors: Hiroyuki Suzuki, Kariya (JP); Yutaka Naito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/080,071

(22) PCT Filed: Apr. 11, 2017

(86) PCT No.: PCT/JP2017/014856
§ 371 (c)(1),
(2) Date: Aug. 27, 2018

(87) PCT Pub. No.: WO2017/179585
PCT Pub. Date: Oct. 19, 2017

(65) Prior Publication Data

US 2019/0063137 A1 Feb. 28, 2019

(30) Foreign Application Priority Data

Apr. 12, 2016 (JP) ................................ 2016-079602
Apr. 12, 2016 (JP) ................................ 2016-079603

(51) Int. Cl.
*E05F 15/695* (2015.01)
*H02P 3/06* (2006.01)
(Continued)

(52) U.S. Cl.
CPC ............... *E05F 15/695* (2015.01); *B60J 1/17* (2013.01); *E05F 15/689* (2015.01); *H02P 3/06* (2013.01); *B60J 7/02* (2013.01); *E05Y 2900/55* (2013.01)

(58) Field of Classification Search
CPC ......... E05F 15/689; E05F 15/695; B60J 1/17; H02P 3/06
(Continued)

(56) References Cited

U.S. PATENT DOCUMENTS

| | | | | |
|---|---|---|---|---|
| 5,654,616 A * | 8/1997 | Suriano | B60S 1/08 307/112 |
| 7,362,068 B2 * | 4/2008 | Yamamoto | H02H 7/0851 318/266 |
| 2009/0299580 A1 * | 12/2009 | Sakai | E05F 15/695 701/49 |

FOREIGN PATENT DOCUMENTS

| | | |
|---|---|---|
| JP | H10-147146 A | 6/1998 |
| JP | 2002-327574 A | 11/2002 |

(Continued)

OTHER PUBLICATIONS

Jun. 27, 2017 International Search Report issued in International Patent Application No. PCT/JP2017/014856.

(Continued)

*Primary Examiner* — Jorge L Carrasquillo
(74) *Attorney, Agent, or Firm* — Oliff PLC

(57) ABSTRACT

An opening-closing body is operated toward an end position of the movable range, a section where the motor application voltage is set to a fixed value defines a first section. A section set between the first section and the end position defines a second section. The controller is configured to execute speed reduction control and stop control in the second section. At a point in time when the rotation speed of the motor body becomes less than or equal to a second threshold value, in the first section or the second section, the controller sets the motor application voltage that is applied from the point in time until the opening-closing body reaches the end position
(Continued)

and the stop control is executed to a voltage value that is greater than or equal to the motor application voltage applied at the point in time.

7 Claims, 6 Drawing Sheets

(51) Int. Cl.
*B60J 1/17* (2006.01)
*E05F 15/689* (2015.01)
*B60J 7/02* (2006.01)

(58) Field of Classification Search
USPC ................ 318/504, 282, 286, 437, 466, 467
See application file for complete search history.

(56) References Cited

FOREIGN PATENT DOCUMENTS

| | | | | |
|---|---|---|---|---|
| JP | 2002327574 | A | * | 11/2002 |
| JP | 2004-116051 | A | | 4/2004 |
| JP | 2007-63889 | A | | 3/2007 |

OTHER PUBLICATIONS

Oct. 16, 2018 International Preliminary Report on Patentability issued in International Patent Application No. PCT/JP2017/014856.

* cited by examiner

DRIVE MOTOR FOR OPENING AND CLOSING BODY

TECHNICAL FIELD

The present invention relates to an opening-closing body drive motor that automatically opens and closes, for example, a power window or a sliding roof included in a vehicle.

BACKGROUND ART

A prior art opening-closing body drive motor that opens and closes, for example, a power window includes a motor body and a controller. The motor body is configured to open and close a window glass between a fully closed position and a fully open position. The controller controls an operation mode of the window glass via the motor body by varying an application voltage, which is applied to the motor body, based on position information of the window glass. A controller of such an opening-closing body drive motor may execute so-called slow start control, which operates the window glass to open at a low speed when starting to move from the fully closed position, or so-called slow stop control, which gradually slows the operated window glass before the window glass reaches an end position (fully closed position and fully open position) of its movable range (for example, refer to patent document 1). When a controller executes such low speed operation control (slow start/slow stop control) near the fully closed position, the voltage applied to the motor is controlled based on the position information of the window glass so that in a section from the fully closed position to a predetermined position, the window glass is operated at an operation speed that is lower than that in other sections (normal speed). This limits generation of noise in a drive system such as a window regulator and a speed reduction mechanism when the window glass reaches the end position or when the window glass starts to move from the fully closed position.

PRIOR ART DOCUMENT

Patent Document

Patent Document 1: Japanese Laid-Open Patent Publication No. 2007-63889

SUMMARY OF THE INVENTION

Problems that are to be Solved by the Invention

In an opening-closing body drive motor such as that described above, the rotation speed of the motor body varies in accordance with loads during an operation of the window glass. When the rotation speed of the motor body is less than or equal to a predetermined threshold value, it is determined that the window glass has reached the end position (fully closed position or fully open position), and the driving of the motor is stopped. However, during an operation of the window glass, the loads (e.g., sliding load between window glass and belt molding of vehicle door) vary depending on the use environment. In an environment that increases the loads beyond the assumption, even when the window glass has not reached the end position during a low speed operation (under slow stop control), the rotation speed of the motor body may be reduced to the threshold value or below and the driving of the motor may be stopped. This is particularly undesirable because the window glass cannot completely shut (the window glass cannot be operated to the fully closed position).

Additionally, there are recent demands for improvement in airtightness of the vehicle interior and weight reduction of doors to improve fuel economy. However, in a vehicle having a highly airtight interior or a vehicle having light doors, when closing a door, the air pressure of the vehicle interior hinders the door from shutting (the door tends to be ajar). As a solution, a recent opening-closing body drive motor operates a window glass, when located in or near the fully closed position, to open by a predetermined width based on detection that the vehicle door is open (the opening operation is irrespective of operation of opening-closing switch). The open window glass provides an escapeway of air in the vehicle interior and allows the vehicle door to easily shut (the door does not tend to be ajar). Additionally, after the vehicle door is shut, the window glass is operated to close based on detection that the vehicle door is closed (the closing operation is irrespective of operation of opening-closing switch).

If the function of such automatic operation control of the window glass executed when opening and closing the door is merely combined with the function of the above low speed operation control executed near the fully closed position, the operation speed of the window glass under the automatic operation control executed when opening and closing the door is low corresponding to the operation speed of the window glass under the low speed operation control. This prolongs the operation time of the window glass in the automatic operation control, which is executed when opening and closing the door, and may be bothersome to the user.

A first object of the present invention is to provide an opening-closing body drive motor having a slow stop function that avoids an unintentional stop of an opening-closing body before the opening-closing body reaches an end position of a movable range.

A second object of the present invention is to provide an opening-closing body drive motor that has the function of automatic operation control of a window glass executed when opening and closing a door and the function of low speed operation control executed near a fully closed position and shortens an operation time of the window glass in the automatic operation control.

Means for Solving the Problem

To achieve the first object described above, one aspect of the present invention provides an opening-closing body drive motor configured to open and close an opening-closing body of a vehicle in a predetermined movable range. The opening-closing body drive motor includes a motor body and a controller that controls an operation mode of the opening-closing body via the motor body by varying a motor application voltage, which is applied to the motor body, based on position information of the opening-closing body. When the opening-closing body is operated toward an end position of the movable range, a section where the motor application voltage is set to a fixed value defines a first section. A section set between the first section and the end position defines a second section. The controller is configured to execute speed reduction control and stop control in the second section. The speed reduction control gradually reduces the motor application voltage from the fixed value. The stop control stops driving of the motor body when a rotation speed of the motor body is less than or equal to a first threshold value. At a point in time when the rotation speed of the motor body becomes less than or equal to a second threshold value, which is greater than the first threshold value, in the first section or the second section, the controller is configured to set the motor application voltage that is applied from the point in time until the opening-closing body reaches the end position and the stop control is executed to a voltage value that is greater than or equal to the motor application voltage applied at the point in time.

To achieve the second object described above, a further aspect of the present invention provides an opening-closing body drive motor configured to open and close an opening-closing body included in a vehicle door between a fully closed position and a fully open position. The opening-closing body drive motor includes a motor body and a controller that operates the opening-closing body to open and close via the motor body based on operation of an opening-closing switch. A set position is set between the fully closed position and the fully open position. A section from the set position to the fully closed position defines a first section. A section located closer to the fully open position than the first section defines a second section. The controller is configured to execute low speed operation control and automatic operation control. The low speed operation control sets an operation speed of an opening-closing operation of the opening-closing body based on operation of the opening-closing switch to be lower in the first section than in the second section. The automatic operation control operates the opening-closing body to open when the opening-closing body is located in the first section based on detection that the vehicle door is open and operates the opening-closing body to close based on a subsequent detection that the vehicle door is closed. In at least one of the opening operation and the closing operation of the opening-closing body based on control of the controller, the operation speed of the opening-closing body under the automatic operation control is set to be higher than the operation speed of the opening-closing body under the low speed operation control.

EMBODIMENTS OF THE INVENTION

A first embodiment of a power window system, which corresponds to an opening-closing body drive system including an opening-closing body drive motor, will now be described.

Figure 1:
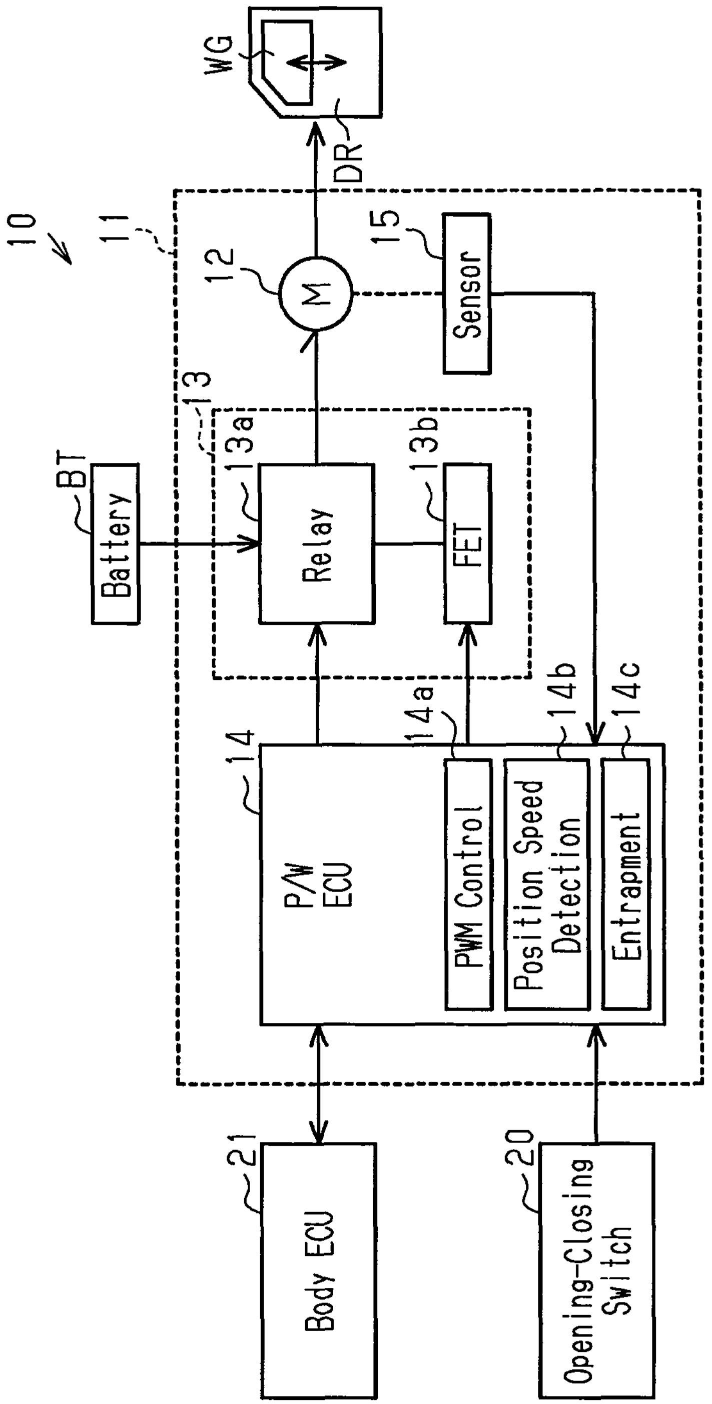
FIG. 1 is a schematic configuration diagram of a system including a first embodiment of a power window motor according to the present invention.

As shown in FIG. 1, a power window system 10 installed in a vehicle includes a power window motor 11 and a body electric control unit (ECU) 21 connected to communicate with the power window motor 11. The power window motor 11 corresponds to an opening-closing body drive motor installed in a vehicle door DR to automatically open and close a window glass WG, which corresponds to an opening-closing body of the vehicle door DR.

The power window motor 11 includes a motor body 12, a drive circuit 13, and a power window ECU 14 (P/W ECU), which are integrally coupled to each other.

The motor body 12 is driven to rotate based on the supply of drive power from the drive circuit 13 and operates the window glass WG to vertically open and close via a window regulator (not shown).

The drive circuit 13 includes a relay circuit **13*a* and a field effect transistor 13*b* (FET). The relay circuit 13*a*, which receives the supply of power from an on-board battery BT, supplies drive power to the motor body 12 for forward reverse driving and interrupts the supply. The FET 13*b*, which is a semiconductor switching element, undergoes pulse width modulation (PWM) control to adjust the drive power output from the relay circuit 13*a*. More specifically, the relay circuit 13*a* drives to forwardly and reversely rotate the motor body 12 and stops the driving, that is, operates the window glass WG in an opening or closing direction and stops the operation. The FET 13*b* changes the rotation speed of the motor body 12, that is, the operation speed of the window glass WG. The relay circuit 13*a* and the FET 13*b* are controlled by the P/W ECU 14**.

The P/W ECU 14 includes a PWM controller **14*a*, a position speed detection portion 14*b*, and an entrapment processing portion 14*c*. The P/W ECU 14 uses the PWM controller 14*a*, the position speed detection portion 14*b*, the entrapment processing portion 14*c*, and the like to execute various kinds of control related to the opening-closing operation of the window glass WG. When various kinds of control are executed, the P/W ECU 14 receives a rotation pulse signal that is in synchronization with rotation of the motor body 12 from a rotation sensor 15. The P/W ECU 14 also receives an opening or closing instruction signal from an opening-closing switch 20** arranged, for example, on the vehicle door DR.

The P/W ECU 14 switches the relay circuit **13*a* to a power feedable state (ON), for example, in a feeding direction that forwardly rotates the motor body 12 when an opening instruction signal is input and in a feeding direction that reversely rotates the motor body 12 when a closing instruction signal is input. Additionally, in this case, the PWM controller 14*a* of the P/W ECU 14 transmits a PWM control signal to a control terminal of the FET 13*b* to switch the FET 13*b* between an on-fixed drive (100% duty) and an on-off drive at a predetermined frequency (variable duty). When there is no input of opening and closing instruction signals, the P/W ECU 14 switches the relay circuit 13*a* to stop (OFF) the supply of power to the motor body 12, and the PWM controller 14*a* turns the FET 13*b*** off using the PWM control signal.

The position speed detection portion **14*b* detects the rotation position of the motor body 12, that is, the position of the window glass WG, based on the rotation pulse signal that is in synchronization with rotation of the motor body 12, more specifically, a count of edges of the pulse signal. The position information of the window glass WG is each time stored in a memory (not shown) of the P/W ECU 14. Additionally, the position speed detection portion 14*b* detects the rotation speed of the motor body 12 (operation speed of window glass WG) in the same manner based on the rotation pulse signal, more specifically, the length of a cycle of the pulse signal. As the rotation speed of the motor body 12** decreases, a cycle of the pulse signal becomes longer.

When the motor body 12 is closing the window glass WG and the rotation speed of the motor body 12 is decreased to a reference speed or below, the entrapment processing portion 14*c* determines that an entrapment has occurred between the window glass WG in the closing operation and the vehicle door DR. In this case, if the operation speed of the window glass WG changes in accordance with, for example, the position of the window glass WG during the operation, the reference speed for the entrapment determination is changed, accordingly. When determining that an entrapment has occurred, the entrapment processing portion 14*c* controls the relay circuit 13*a* and the FET 13*b* so that the window glass WG is operated to open, for example, by a predetermined amount to allow the entrapped object to be released. Further, the entrapment processing portion 14*c* may determine occurrence of an object entrapment between the window glass WG in an opening operation and the vehicle door DR. In this case, the entrapment processing portion 14*c* controls the relay circuit 13*a* and the FET 13*b* so that the window glass WG is operated to close, for example, by a predetermined amount to allow the entrapped object to be released.

The P/W ECU 14 is connected to the body ECU 21, which is a host ECU, to perform communication via a vehicle communication system. The vehicle communication system is, for example, local interconnect network (LIN) communication or controller area network (CAN) communication. The P/W ECU 14 obtains various kinds of vehicle information that are needed from the body ECU 21.

The operation (effect) of the power window system 10 of the first embodiment will now be described.

The P/W ECU 14 recognizes the opening-closing position of the window glass WG with the position speed detection portion 14*b* and adjusts drive power (motor application voltage) supplied from the drive circuit 13 to the motor body 12 through PWM control of the FET 13*b* to control the speed of opening-closing operation of the window glass WG. As indicated by the solid lines in FIGS. 2A and 2B (position of window glass WG is referred to as window position), when the window glass WG is operated to close and reaches a position near the fully closed position, the P/W ECU 14 executes slow stop control that slows the window glass WG from the normal speed in a predetermined mode.

For example, in the entire process of the closing operation of the window glass WG, a section that is near the fully closed position including a fully closed position Px, which corresponds to an end position, is set to a slow stop section A1. The slow stop section A1 is a section from a slow start position P0, at which the slow stop starts, to the fully closed position Px. Additionally, a first position P1 is set at an intermediate position of the slow stop section A1.

The window glass WG is operated to close at the normal speed before the slow stop section A1. When the window glass WG reaches the slow start position P0, a speed reduction section A2 (second section) is set until the first position P1 is reached, and the operation speed of the window glass WG is gradually reduced from the normal speed to a predetermined low speed. Subsequently, when the window glass WG reaches the first position P1, a fixed low speed section A3 is set until the fully closed position Px is reached, and the operation speed of the window glass WG is fixed at a predetermined low speed.

To execute speed control of the mode described above, as indicated by the solid line in FIG. 2B, when the window glass WG is operated to close at the normal speed in a fixed normal speed section A4 (first section, or section toward fully open position from slow start position P) before the slow stop section A1, the PWM controller 14*a* keeps the FET 13*b* on (100% duty). More specifically, the PWM controller 14*a* sets the motor application voltage of the motor body 12 to a battery voltage Vb.

To reduce the operation speed from the normal speed in the slow stop section A1, the PWM controller 14*a* adjusts the duty below 100% to drive the FET 13*b* on and off. In the speed reduction section A2 from the slow start position P0 to the first position P1, the PWM controller 14*a* gradually reduces the motor application voltage from the battery voltage Vb (100% duty) to a low speed drive voltage Va. Then, in the fixed low speed section A3 from the first position P1 to the fully closed position Px, the PWM controller 14*a* fixes the motor application voltage at the low speed drive voltage Va.

When the slow stop section A1 is set in the window glass WG as described above, the fully closed position Px also serves as a mechanical lock position. Thus, the window glass WG is shut at a lower speed than the normal speed in a section near the fully closed position including the fully closed position Px to limit noise and impact that are generated when the window glass WG is mechanically locked in the fully closed position Px. Additionally, when the window glass WG is closing, an object may be entrapped between the window glass WG and the vehicle door DR. Thus, the slow stop section A1 is provided to reduce the speed of the closing operation of the window glass WG so that the object entrapment will not easily occur.

Figure 2A:
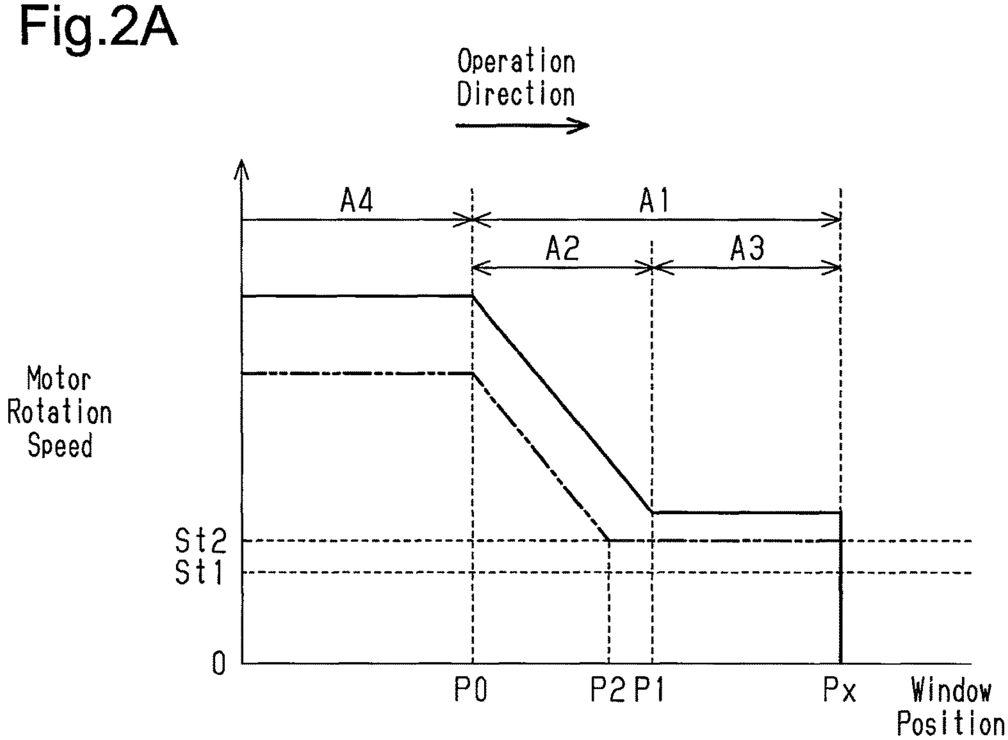
FIGS. 2A and 2B are charts showing operations of the motor shown in FIG. 1.
Figure 2B:
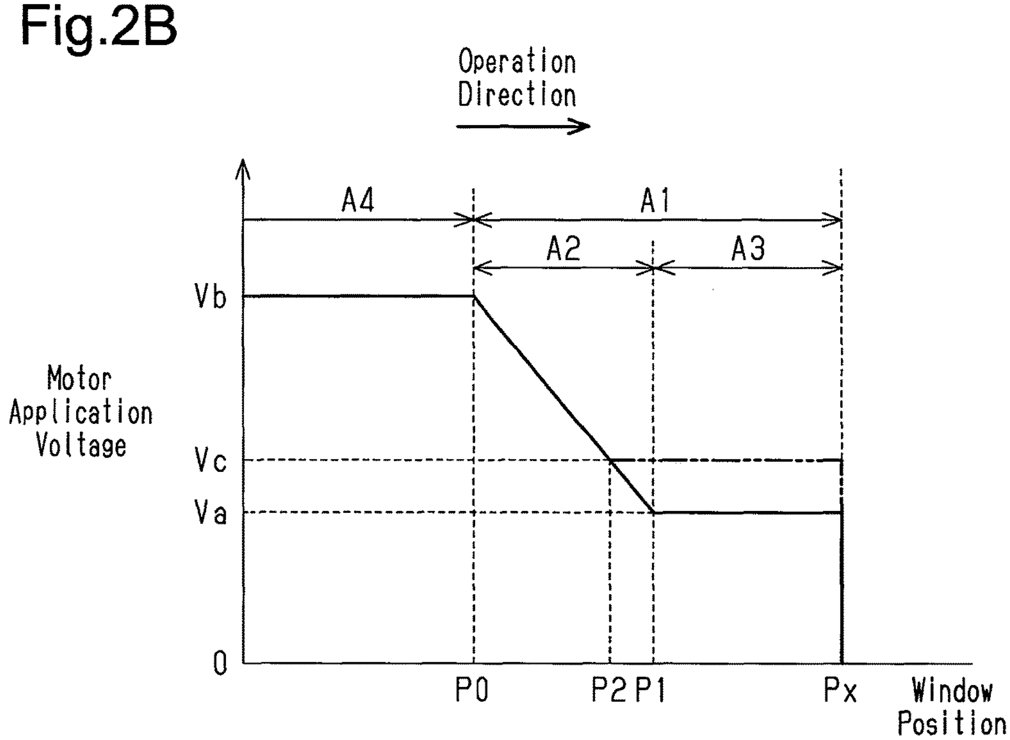

As shown in FIGS. 2A and 2B, when the position speed detection portion 14*b* detects that the rotation speed (motor rotation speed) of the motor body 12 is less than or equal to a first threshold value St1, the P/W ECU 14 stops the driving of the motor body 12, that is, executes stop control that stops the supply of the motor application voltage from the battery BT to the motor body 12 via the relay circuit 13*a*. Thus, when the window glass WG reaches the fully closed position Px, which is the mechanical lock position, the driving of the motor body 12 is stopped.

A case in which during an operation of the window glass WG, loads (e.g., sliding load between window glass WG and belt molding (not shown) of vehicle door DR) increase beyond the assumption, for example, depending on the use environment will now be described in accordance with the double-dashed lines shown in FIGS. 2A and 2B. In this case, the rotation speed of the motor body 12 is lowered by the loads in the fixed normal speed section A4 and the slow stop section A1.

In the speed reduction section A2, the P/W ECU 14 compares the rotation speed of the motor body 12 with a second threshold value St2, which is greater than the first threshold value St1. At a point in time when the rotation speed of the motor body 12 becomes less than or equal to the second threshold value St2, the PWM controller 14*a* sets a subsequent motor application voltage to a voltage value Vc of the motor application voltage applied at the point in time (point in time when the window glass WG has reached position P2 in FIGS. 2A and 2B). As a result, in the closing operation of the window glass WG from the position P2 to the fully closed position Px, the motor body 12 is driven at a rotation speed based on the voltage value Vc. When the window glass WG reaches the fully closed position Px and the rotation speed of the motor body 12 becomes less than or equal to the first threshold value St1, the driving of the motor body 12 is stopped.

The advantageous effects of the first embodiment will now be described below.

(1) When actuating the window glass WG toward the fully closed position Px (end position of movable range), the P/W ECU 14 (PWM controller 14*a*) executes speed reduction control that gradually reduces the motor application voltage from a fixed value in the speed reduction section A2 (second section), which is set between the fixed normal speed section A4 (first section) where the motor application voltage is set to the fixed value and the fully closed position Px. When the rotation speed of the motor body 12 is not less than the first threshold value St1, the P/W ECU 14 continues the speed reduction control. Additionally, when the rotation speed of the motor body 12 is less than or equal to the first threshold value St1, the P/W ECU 14 executes stop control that stops the driving of the motor body 12. At a point in time when the rotation speed of the motor body 12 becomes less than or equal to the second threshold value St2, which is greater than the first threshold value St1, in the speed reduction section A2, the PWM controller 14*a* sets a motor application voltage that is applied from the point in time until the window glass WG reaches the fully closed position Px and the stop control is executed to the voltage value Vc of the motor application voltage applied at the point in time.

In this configuration, in the speed reduction section A2, in which the motor application voltage is gradually reduced from the fixed value used in the fixed normal speed section A4, at a point in time when the rotation speed of the motor body 12 becomes less than or equal to the second threshold value St2, which is greater than the first threshold value St1 serving as the threshold value for stopping the driving of motor, the lower limit is set to the motor application voltage (voltage value Vc) applied at the point in time. As a result, even when the load is greater than the assumption during an operation of the window glass WG, the rotation speed of the motor body 12 will not be less than or equal to the first threshold value St1 and thus the driving of the motor body 12 will not be stopped before the window glass WG reaches the fully closed position Px. This limits occurrence of trouble such that the window glass cannot be shut.

The first embodiment may be modified as follows.

In the first embodiment, the control mode performed in a closing operation of the window glass WG (operation toward fully closed position Px) is described as an example. However, the first embodiment may be applied to an opening operation of the window glass WG (operation toward fully open position).

Figure 3A:
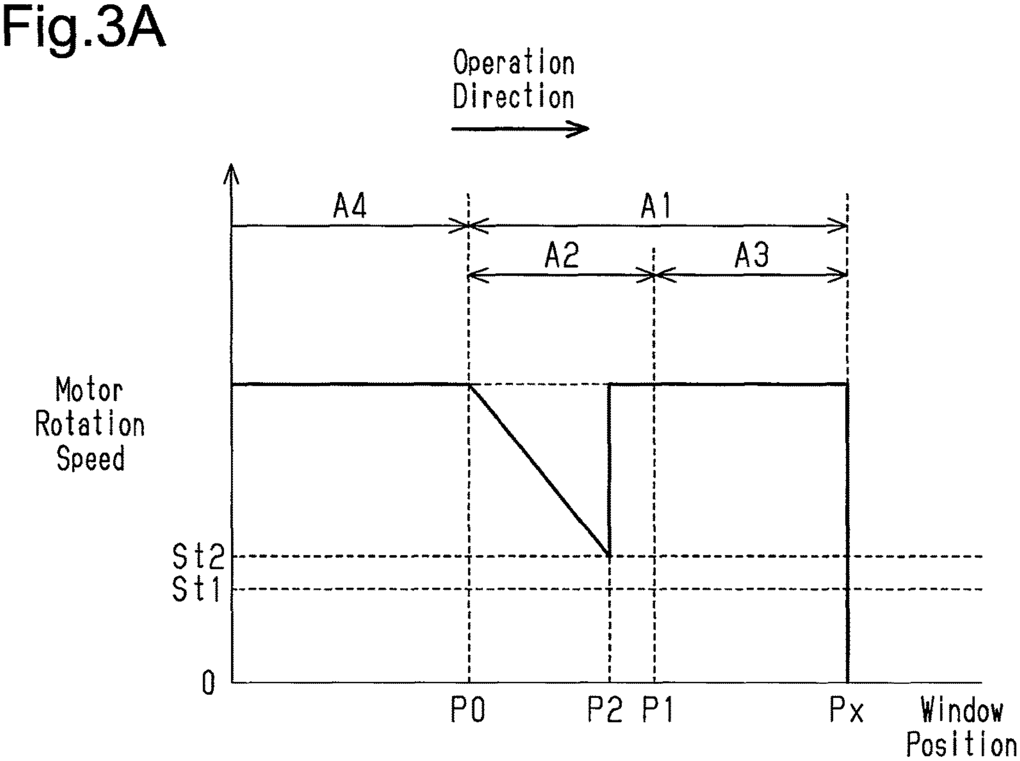
FIGS. 3A and 3B are charts showing operations in a modified example.
Figure 3B:
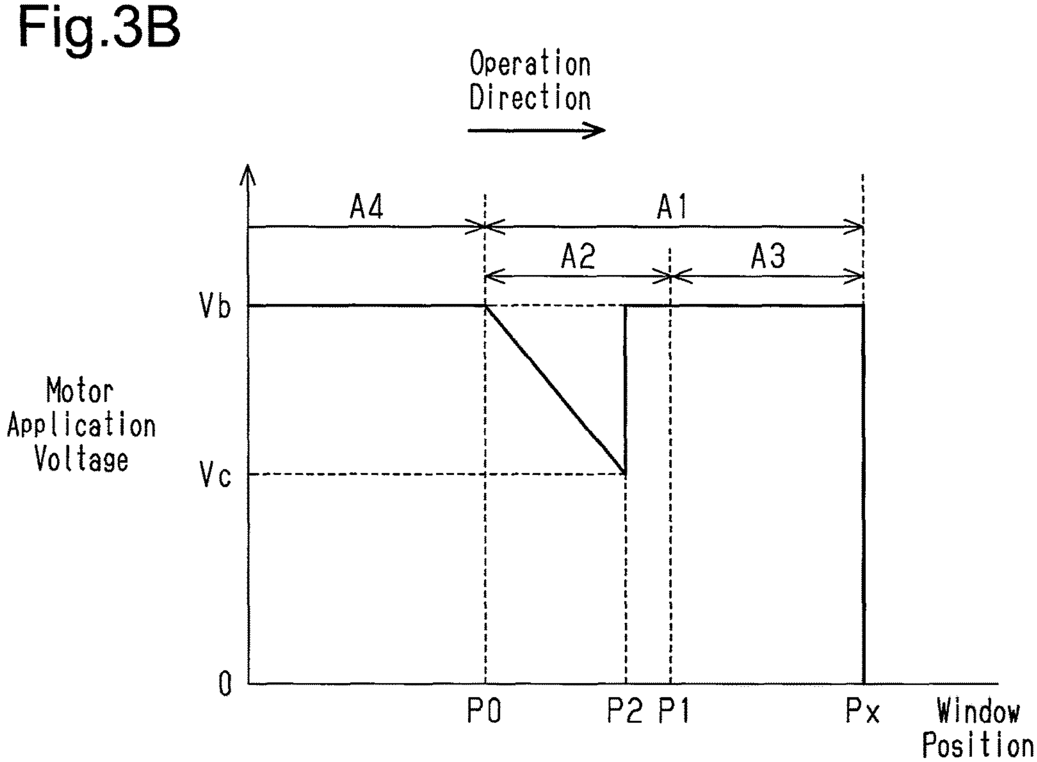

In the first embodiment, at a point in time when the rotation speed of the motor body 12 becomes less than or equal to the second threshold value St2 in the speed reduction section A2, the PWM controller 14*a* sets a subsequent motor application voltage to the voltage value Vc of the motor application voltage applied at the point in time. However, there is no limit to such a configuration. For example, as shown in FIG. 3A, at a point in time when the rotation speed of the motor body 12 becomes less than or equal to the second threshold value St2 in the speed reduction section A2, a motor application voltage that is applied after the point in time (point in time when window glass WG reaches position P2 in FIGS. 3A and 3B) may be fixed at the battery voltage Vb as shown in FIG. 3B. In this configuration, in the closing operation of the window glass WG from the position P2 to the fully closed position Px, the motor body 12 is driven at a rotation speed equivalent to that of the fixed normal speed section A4 (refer to FIG. 3A). Thus, as described in the first embodiment, even when the load is greater than the assumption during an operation of the window glass WG, the rotation speed of the motor body 12 will not be less than or equal to the first threshold value St1 in the speed reduction section A2 and thus the driving of the motor body 12 will not be stopped.

Figure 4A:
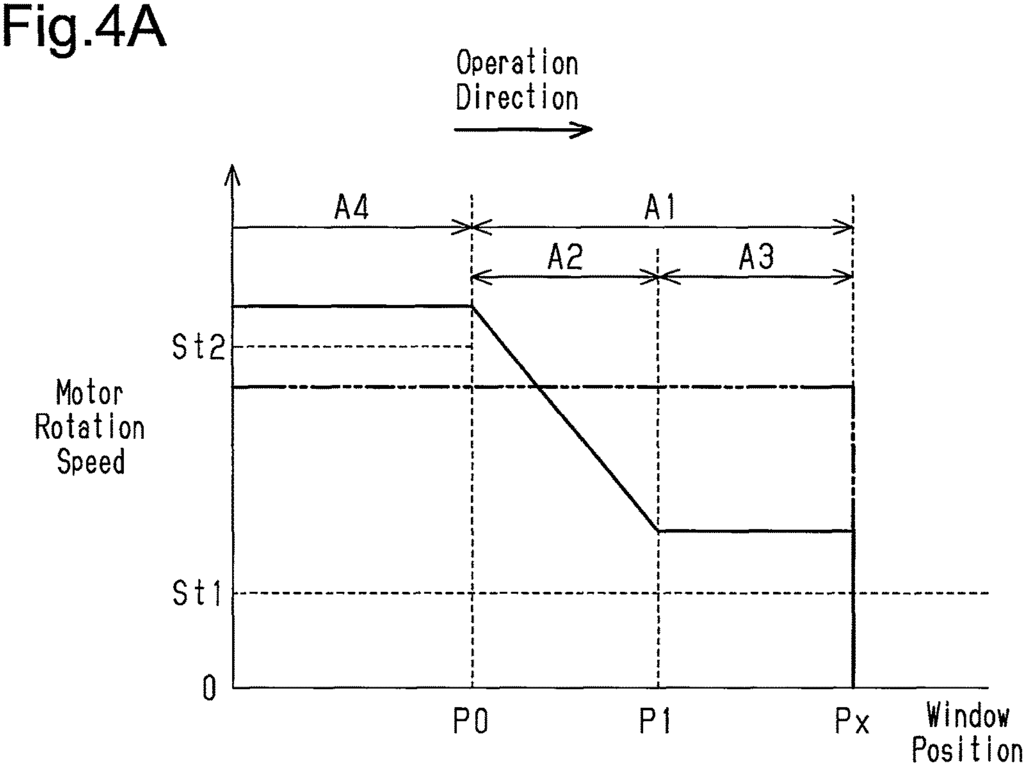
FIGS. 4A and 4B are charts showing operations in a modified example.
Figure 4B:
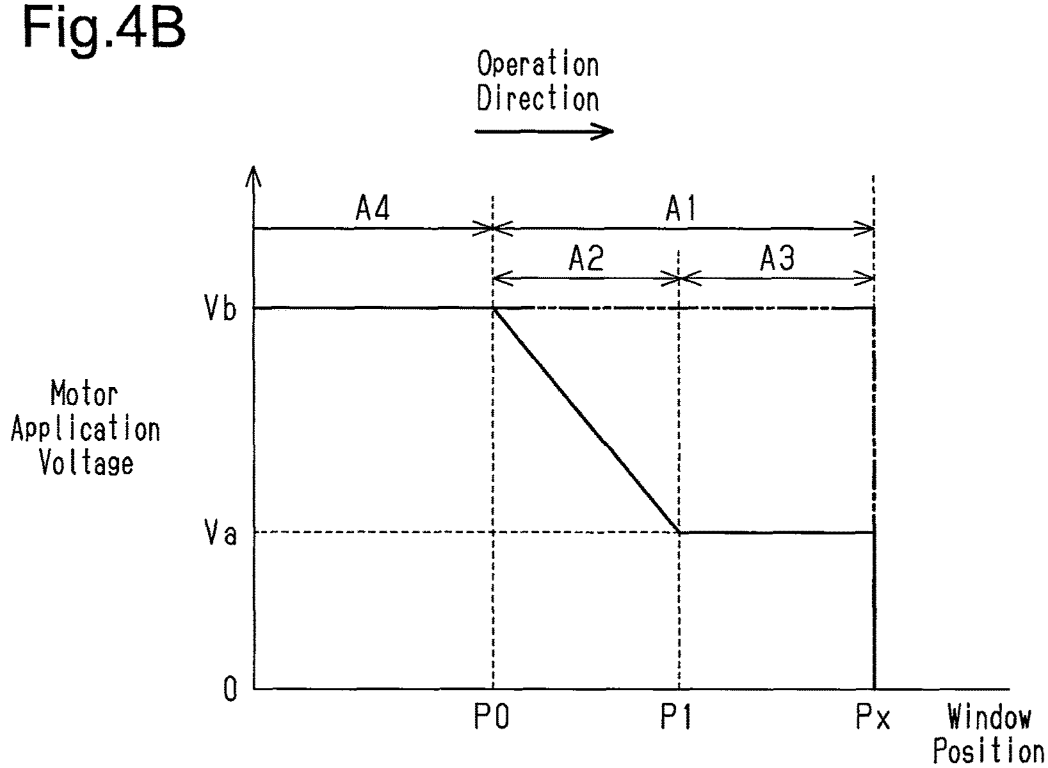

In the first embodiment, the P/W ECU 14 compares the rotation speed of the motor body 12 with the second threshold value St2 in the speed reduction section A2. However, there is no limit to such a configuration. As shown in FIG. 4A, the rotation speed of the motor body 12 may be compared with the second threshold value St2 in the fixed normal speed section A4. Also, in this case, at a point in time when the rotation speed of the motor body 12 becomes less than or equal to the second threshold value St2 in the fixed normal speed section A4, the PWM controller 14*a* sets a subsequent motor application voltage to the motor application voltage (in the present example, battery voltage Vb) applied at the point in time (Refer to FIG. 4B). More specifically, when the load is greater than the assumption during an operation of the window glass WG and the rotation speed of the motor body 12 is less than or equal to the second threshold value St2 in the fixed normal speed section A4, the PWM controller 14*a* controls the FET 13*b* so that the motor application voltage (rotation speed of motor body 12) will not be lowered also in the slow stop section A1. Such a control also reduces situations in which the rotation speed of the motor body 12 becomes less than or equal to the first threshold value St1 and the driving of the motor body 12 is stopped before the window glass WG reaches the fully closed position Px.

The speed reduction mode in the slow stop section A1 is not limited to the mode described in the first embodiment and may be appropriately changed. For example, when the fixed low speed section A3 is not provided before the fully closed position Px, the operation speed of the window glass WG may be reduced from the slow start position P0 to the fully closed position Px (i.e., the speed reduction section A2 may be provided from the slow start position P0 to the fully closed position Px).

In the first embodiment, the PWM controller 14*a* keeps the FET 13*b* on (100% duty) in the fixed normal speed section A4. Instead, the FET 13*b* may be driven on and off in the fixed normal speed section A4 so that the duty is fixed to a value lower than 100%.

The drive circuit 13 includes the relay circuit 13*a* and the FET 13*b*. However, the configuration of the drive circuit is not limited to this. For example, a full-bridge drive circuit having four semiconductor switching elements such as FETs or a half-bridge drive circuit having two semiconductor switching elements may be used.

The subject that is opened and closed is the window glass WG, and the present invention is applied to the power window motor 11 (power window system 10) that opens and closes the window glass WG. However, the present invention may be applied to a different opening-closing body drive motor (opening-closing body drive system) of a vehicle, for example, a motor (system) that drives a sliding roof.

A second embodiment of a power window system, which corresponds to an opening-closing body drive system including an opening-closing body drive motor, will now be described. The same configuration as the first embodiment will not be described in detail.

Figure 5:
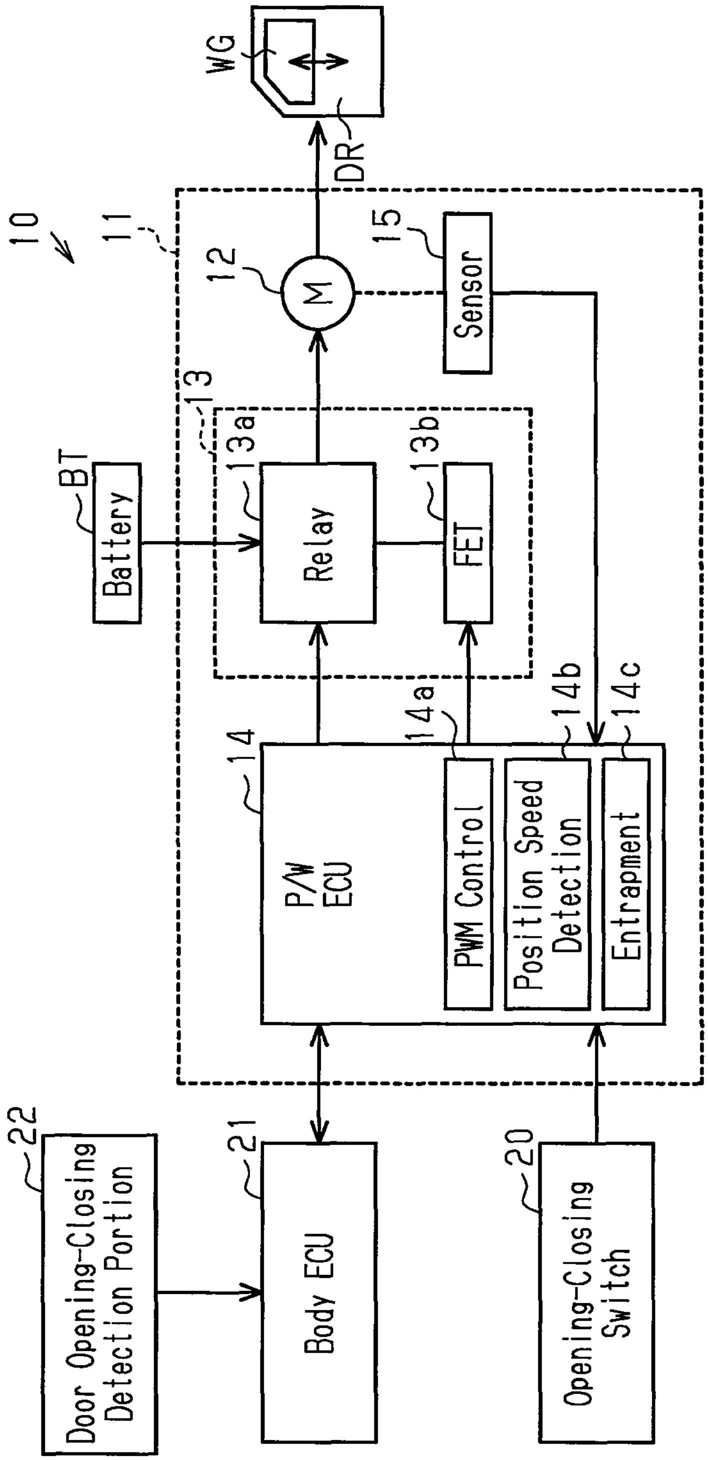
FIG. 5 is a schematic configuration diagram of a system including a second embodiment of a power window motor according to the present invention.

As shown in FIG. 5, the power window system 10 installed in a vehicle includes the power window motor 11, which corresponds to an opening-closing body drive motor that is installed in the vehicle door DR to open and close the window glass WG corresponding to an opening-closing body of the vehicle door DR, and the opening-closing switch 20, which drives the power window motor 11. Additionally, the power window system 10 includes the body electric control unit (ECU) 21 connected to communicate with the power window motor 11.

The P/W ECU 14 recognizes the opening-closing position of the window glass WG with the position speed detection portion 14*b* and adjusts drive power (motor application voltage) supplied from the drive circuit 13 to the motor body 12 through PWM control of the FET 13*b* to control the speed of opening-closing operation of the window glass WG. More specifically, the P/W ECU 14 controls the speed of the opening-closing operation of the window glass WG using a PWM instruction value map stored in advance in a memory (not shown). The PWM instruction value map sets changes in PWM instruction value (voltage instruction value) in accordance with the position of the window glass WG. In the present embodiment, the PWM instruction value map is separately provided for an opening operation and a closing operation. The P/W ECU 14 refers to the PWM instruction value map based on the position information of the window glass WG, which is detected by the position speed detection portion 14*b*, to determine the motor application voltage that is adjusted in PWM control of the FET 13*b*.

The operation (effect) of the power window system 10 of the second embodiment will now be described.

When the opening-closing switch 20 is operated, the P/W ECU 14 executes operation control of the window glass WG based on the opening or closing instruction signal output from the opening-closing switch 20 and operation control of the window glass WG based on a detection signal from a door opening-closing detection portion 22 that detects an open-closed state of the vehicle door DR such as a courtesy switch.

The operation control (hereinafter referred to as normal operation control) of the window glass WG executed by the P/W ECU 14 based on an operation of the opening-closing switch 20 (opening or closing instruction signal) will now be described.

Figure 6A:
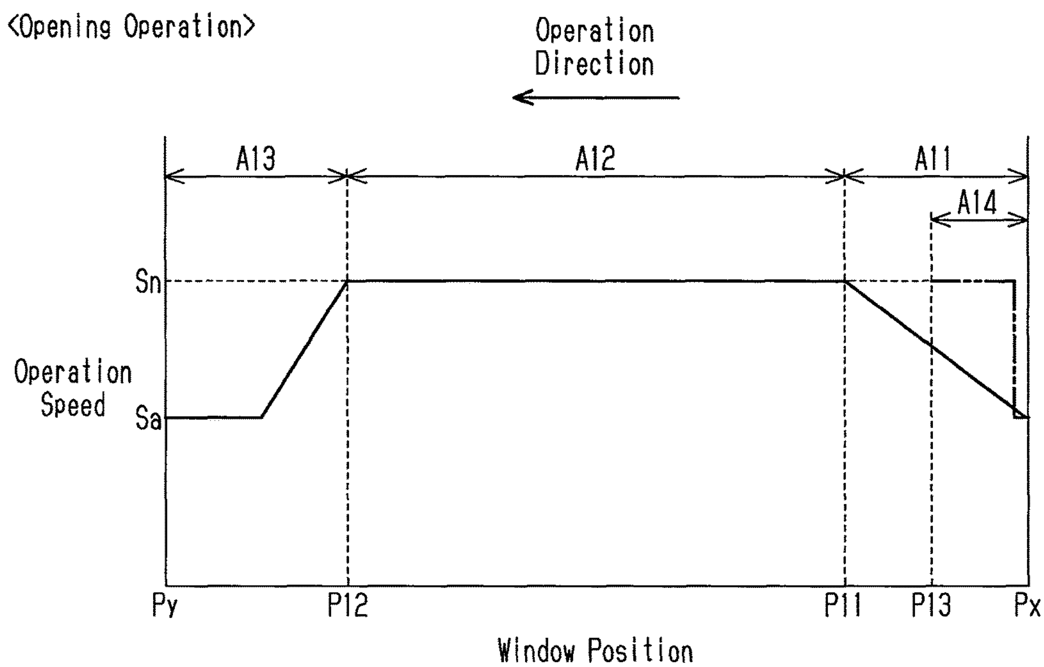
FIGS. 6A and 6B are charts showing operations of the motor shown in FIG. 5.
Figure 6B:
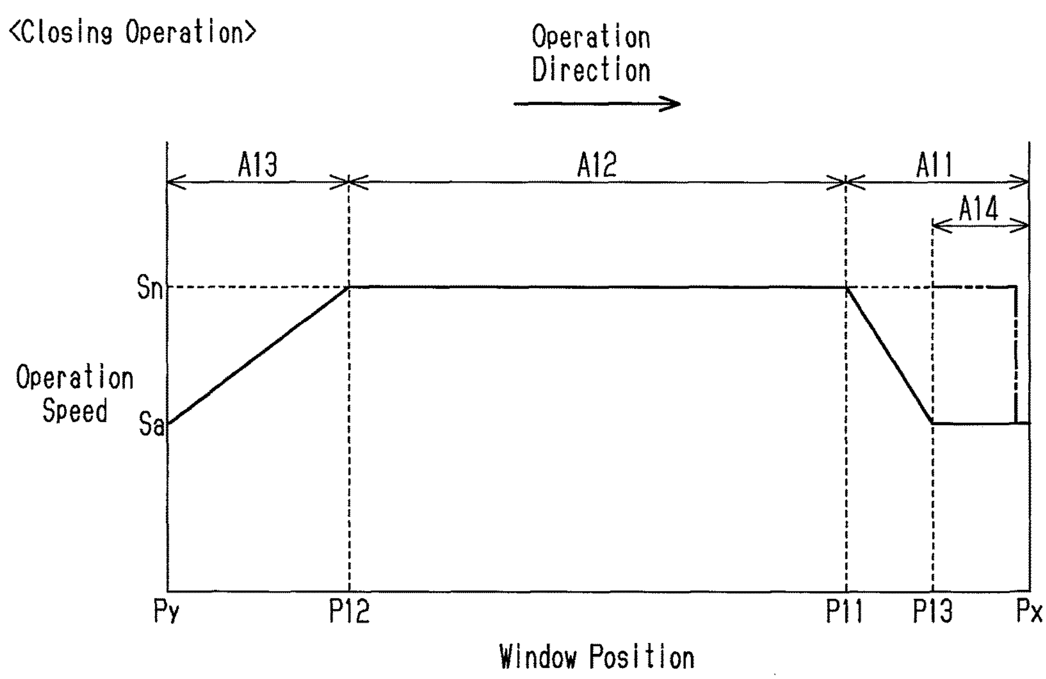

As indicated by the solid line in FIG. 6A, when the window glass WG is operated to open based on an opening instruction signal, the P/W ECU 14 executes slow start control that operates the window glass WG at a low speed when starting to move from the fully closed position Px (or position near fully closed position Px). Additionally, the P/W ECU 14 executes slow stop control that reduces the operation speed of the window glass WG before reaching the fully open position Py. In FIGS. 6A and 6B, the position of the window glass WG is referred to as window position.

Predetermined positions located between the fully closed position Px and the fully open position Py of the window glass WG are set as a first set position P11 and a second set position P12. One of the two set positions that is located closer to the fully closed position Px is referred to as the first set position P11, and one of the two set positions that is located closer to the fully open position Py is referred to as the second set position P12. A section from the fully closed position Px to the first set position P11 is referred to as a first section A11, a section from the first set position P11 to the second set position P12 is referred to as a second section A12, and a section from the second set position P12 to the fully open position Py is referred to as a third section A13.

The P/W ECU 14 gradually increases the speed of the opening operation of the window glass WG to a normal speed Sn in the first section A11 and has the window glass WG perform the opening operation at the normal speed Sn in the second section A12. In the present embodiment, when the window glass WG is operated at the normal speed Sn, the PWM controller 14*a* keeps the FET 13*b* on (100% duty). More specifically, the PWM controller 14*a* sets the motor application voltage to the motor body 12 to the battery voltage. In the third section A13, the P/W ECU 14 operates the window glass WG to open at lower speeds than the normal speed Sn. In the present embodiment, from the second set position P12 to an intermediate position of the third section A13, the speed of the opening operation of the window glass WG is gradually decreased from the normal speed Sn to a predetermined low speed (low speed Sa), and from the intermediate position to the fully open position Py, the speed of the opening operation of the window glass WG is fixed at the low speed Sa.

In the same manner, as indicated by the solid line in FIG. 6B, when the window glass WG is operated to close based on a closing instruction signal, the P/W ECU 14 executes slow start control that operates the window glass WG at a low speed when starting to move from the fully open position Py (or position near fully open position Py). Additionally, the P/W ECU 14 executes slow stop control that reduces the operation speed of the window glass WG before reaching the fully closed position Px.

More specifically, the P/W ECU 14 gradually increases the speed of the closing operation of the window glass WG to the normal speed Sn in the third section A13 and has the window glass WG perform the closing operation at the normal speed Sn in the second section A12. In the first section A11, the P/W ECU 14 operates the window glass WG to close at lower speeds than the normal speed Sn. In the present embodiment, from the first set position P11 to an intermediate position of the first section A11, the speed of the closing operation of the window glass WG is gradually reduced from the normal speed Sn to the low speed Sa, and from the intermediate position to the fully closed position Px, the speed of the closing operation of the window glass WG is fixed at the low speed Sa.

As described above, in the normal operation control executed based on operation of the opening-closing switch 20, the P/W ECU 14 executes the low speed operation control (slow start/slow stop control) in and near the fully closed position Px.

The operation control of the window glass WG executed by the P/W ECU 14 based on a detection signal from the door opening-closing detection portion 22 (hereinafter referred to as automatic operation control at a door opening-closing time) will now be described.

At a point in time when a detection signal indicating that the vehicle door DR is open is received from the door opening-closing detection portion 22 via the body ECU 21, the P/W ECU 14 refers to the position of the window glass WG at the point in time (hereinafter referred to as position Ps). The P/W ECU 14 stores the position Ps of the window glass WG in the memory. If the position Ps of the window glass WG is located in a section (fourth section A14) from the fully closed position Px to a third set position P13, the P/W ECU 14 operates the window glass WG to open to the third set position P13. The third set position P13 is set so that the open amount of the window glass WG (area of opening formed when the window glass WG is open) is appropriate for releasing the air from the vehicle interior when closing the vehicle door DR. In the present embodiment, the third set position P13 is set to be closer to the fully closed position Px than the first set position P11. In other words, the fourth section A14 is set to be included in the first section A11. It is preferred that the third set position P13 be set to a position moved from the fully closed position Px toward the fully open position Py by approximately 10 mm to 40 mm.

In the opening operation of the window glass WG under the automatic operation control, the P/W ECU 14 controls the speed of the opening operation of the window glass WG using the PWM instruction value map for the automatic operation control, which is stored in advance in the memory (not shown). More specifically, as indicated by the double-dashed line in FIG. 6A, the P/W ECU 14 operates the window glass WG to open at the normal speed Sn until the window glass WG reaches the third set position P13 from the position Ps. When the position Ps is located at the fully closed position Px, the P/W ECU 14 operates the window glass WG to open at the low speed Sa only in a small section from the fully closed position Px (section of approximately 1 mm from the fully closed position Px) and then at the normal speed Sn until the window glass WG reaches the third set position P13. Therefore, the average speed of the opening operation in the fourth section A14 under the automatic operation control (average value of fourth section A14 set in PWM instruction value map for automatic operation control) is set to be higher than the average speed of the opening operation in the fourth section A14 under the normal operation control (slow start control) (average value of fourth section A14 set in PWM instruction value map for normal operation control).

As described above, based on the detection signal indicating that the vehicle door DR is open, the P/W ECU 14 operates the window glass WG to open from the position Ps to the third set position P13 at the normal speed Sn and stops the window glass WG in the third set position P13. This ensures a sufficient opening amount of the window glass WG and reduces situations in which the vehicle door DR is ajar when closed.

When the vehicle door DR is shut, the P/W ECU 14 receives a detection signal indicating that the vehicle door DR is shut from the door opening-closing detection portion 22 via the body ECU 21 and operates the window glass WG to close from the third set position P13 to the position Ps. At this time, the P/W ECU 14 controls the speed of the closing operation of the window glass WG using the PWM instruction value map for the automatic operation control stored in advance in the memory (not shown). The PWM instruction value map for the automatic operation control is separately provided for an opening operation and a closing operation.

In the closing operation of the window glass WG under the automatic operation control, as indicated by the double-dashed line in FIG. 6B, the P/W ECU 14 operates the window glass WG to close from the third set position P13 to the position Ps at the normal speed Sn. When the position Ps is located in the fully closed position Px, the P/W ECU 14 sets the speed of the closing operation of the window glass WG to the low speed Sa in a section immediately before the fully closed position Px (section of approximately 1 mm immediately before fully closed position Px). Therefore, the average speed of the closing operation in the fourth section A14 under the automatic operation control (average value of fourth section A14 set in PWM instruction value map for automatic operation control) is set to be higher than the average speed of the closing operation in the fourth section A14 under the normal operation control (slow stop control) (average value of fourth section A14 set in PWM instruction value map for normal operation control).

The automatic operation control at a door opening-closing time is executed when the position Ps of the window glass WG is located in the fourth section A14 at a point in time when the P/W ECU 14 receives a detection signal indicating that the vehicle door DR is open. In other words, when the position Ps is located outside the fourth section A14 (i.e., the window glass WG is located closer to the fully open position Py than the third set position P13), the window glass WG is sufficiently open. Thus, the automatic operation control at a door opening-closing time will not be executed.

The advantageous effects of the second embodiment will now be described below.

(2) The speeds of the opening operation and the closing operation of the window glass WG under the automatic operation control at a door opening-closing time are respectively set to be higher than the speeds of the opening operation and the closing operation of the window glass WG that are performed under the low speed operation control (slow start/slow stop control in normal operation control) in the fourth section A14 including the fully closed position Px. Thus, while the function of automatic operation control at a door opening-closing time and the function of low speed operation control (slow start/slow stop control) executed near the fully closed position Px are both provided, the operation time of the window glass WG is shortened in the automatic operation control at a door opening-closing time. As a result, the operation of the window glass WG under the automatic operation control at a door opening-closing time is less bother to the user.

(3) In the automatic operation control at a door opening-closing time, the P/W ECU 14 operates the window glass WG to open at the low speed Sa in a small section when starting to move from the fully closed position Px. Additionally, in the automatic operation control at a door opening-closing time, the P/W ECU 14 reduces the speed of the closing operation of the window glass WG from the normal speed Sn to the low speed Sa immediately before the fully closed position Px. Thus, while the operation time of the window glass WG is shortened in the automatic operation control at a door opening-closing time, generation of noise in a drive system such as a window regulator and a speed reduction mechanism is minimized when the window glass WG starts to move from the fully closed position Px, which is the mechanical lock position, or reaches the fully closed position Px.

The second embodiment may be modified as follows.

In the second embodiment of the automatic operation control at a door opening-closing time, the window glass WG is operated to close from the third set position P13 to the position Ps based on detection that the vehicle door DR is closed. Instead, the window glass WG may be operated to close from the third set position P13 to the fully closed position Px.

In the second embodiment, in the automatic operation control at a door opening-closing time, the P/W ECU 14 operates the window glass WG to open at the low speed Sa in a small section when starting to move from the fully closed position Px. Instead, the window glass WG may be operated to open from the fully closed position Px at the normal speed Sn. In addition, in the second embodiment, in the automatic operation control at a door opening-closing time, the P/W ECU 14 reduces the speed of the closing operation of the window glass WG from the normal speed Sn to the low speed Sa immediately before the fully closed position Px. Instead, the window glass WG may be operated to close to the fully closed position Px at the normal speed Sn.

The speed reduction mode and speed increase mode in the first and second sections A11 and A13 in the normal operation control of the second embodiment may be appropriately changed. For example, in slow start control executed in the first section A11, the speed of the opening operation of the window glass WG may be fixed at the low speed Sa from the fully closed position Px to the intermediate position of the first section A11. For example, in slow stop control executed in the first section A11, instead of providing the fixed speed section before the fully closed position Px, the operation speed of the window glass WG may be reduced until the fully closed position Px is reached.

In the second embodiment, in the automatic operation control at a door opening-closing time, the speed control is executed using the PWM instruction value map for the automatic operation control. Instead, in the automatic operation control, the duty of PWM control may be fixed to a predetermined value (e.g., 100% duty). This dispenses with the PWM instruction value map for the automatic operation control and reduces the used amount of the memory. Further, the FET 13*b* will not perform the duty adjustment in the automatic operation control at a door opening-closing time. This simplifies control.

In the second embodiment, the speeds of the opening operation and the closing operation of the window glass WG under the automatic operation control at a door opening-closing time are respectively set to the speeds of the opening operation and the closing operation of the window glass WG performed in the fourth section A14 under the low speed operation control (slow start/slow stop control in normal operation control). However, there is no limit to such a configuration.

For example, in the automatic operation control at a door opening-closing time, the speed of only the opening operation of the window glass WG may be set to be higher than the speed of the opening operation of the window glass WG performed in the fourth section A14 under the low speed operation control. In this case, in the automatic operation control at a door opening-closing time, it is preferred that the speed of the closing operation of the window glass WG be controlled based on, for example, the PWM instruction value map for the normal operation control (i.e., low speed operation). With this configuration, because an object may be entrapped between the window glass WG in the closing operation and the vehicle door DR, the window glass WG is operated to close at a low speed under the automatic operation control at a door opening-closing time. Thus, the object entrapment will not easily occur. Thus, while the window glass WG is appropriately operated in the viewpoint of an object entrapment, the time of the opening operation of the window glass WG is shortened in the automatic operation control at a door opening-closing time.

In the automatic operation control at a door opening-closing time, when the speed of only one of the opening and closing operations of the window glass WG is set to be higher than the operation speed of the window glass WG in the fourth section A14 under the low speed operation control, the opening-closing operation time (total time of opening operation and closing operation) of the window glass WG is longer that of the second embodiment in the automatic operation control at a door opening-closing time. Thus, as described in the second embodiment, when the speeds of the opening operation and the closing operation of the window glass WG under the automatic operation control at a door opening-closing time are respectively set to be higher than the speeds of the opening operation and the closing operation of the window glass WG performed in the fourth section A14 under the normal operation control, the operation time of the window glass WG is further shortened in the automatic operation control at a door opening-closing time. As a result, the operation of the window glass WG under the automatic operation control at a door opening-closing time is further less bother to the user.

In the second embodiment, the third set position P13 is set to be closer to the fully closed position Px than the first set position P11. Instead, the third set position P13 may be set in the same position as the first set position P11 or set to be closer to the fully open position Py than the first set position P11.

In the second embodiment, in the normal operation control and the automatic operation control at a door opening-closing time, the P/W ECU 14 executes speed control (PWM control) of the opening-closing operation of the window glass WG using the PWM instruction value map. Instead of or in addition to a map, for example, operation expressions may be used to execute speed control (PWM control).

The drive circuit 13 includes the relay circuit 13*a* and the FET 13*b*. However, the configuration of the drive circuit is not limited to this. For example, a full-bridge drive circuit having four semiconductor switching elements such as FETs or a half-bridge drive circuit having two semiconductor switching elements may be used. In the second embodiment, the P/W ECU 14 adjusts the motor application voltage using PWM control. However, there is no limit to such a particular configuration.

In the second embodiment, the power window motor 11 includes the motor body 12 and the P/W ECU 14 that are integrally coupled to each other. However, the P/W ECU 14 and the motor body 12 may be configured to be separate from each other.

The first and second embodiments and modified examples may be combined.

The invention claimed is:

1. An opening-closing body drive motor configured to open and close an opening-closing body of a vehicle in a predetermined movable range, the opening-closing body drive motor comprising:

a motor body; and a controller that controls an operation mode of the opening-closing body via the motor body by varying a motor application voltage, which is applied to the motor body, based on position information of the opening-closing body, wherein when the opening-closing body is operated toward an end position of the movable range, a section where the motor application voltage is set to a fixed value defines a first section, a section set between the first section and the end position defines a second section, the controller is configured to execute speed reduction control and stop control in the second section, the speed reduction control gradually reduces the motor application voltage from the fixed value, the stop control stops driving of the motor body when a rotation speed of the motor body is less than or equal to a first threshold value, and at a point in time when the rotation speed of the motor body becomes less than or equal to a second threshold value, which is greater than the first threshold value, in the first section or the second section, the controller is configured to set the motor application voltage that is applied from the point in time until the opening-closing body reaches the end position and the stop control is executed to a voltage value that is greater than or equal to the motor application voltage applied at the point in time.

2. The opening-closing body drive motor according to claim 1, wherein the end position of the opening-closing body is a fully closed position of the opening-closing body.

3. The opening-closing body drive motor according to claim 1, wherein the opening-closing body, which is a subject that is opened and closed by the motor body, is a window glass included in a vehicle door.

4. The opening-closing body drive motor according to claim 1, wherein the controller is configured to continue the speed reduction control when the rotation speed of the motor body is not less than the first threshold value.

5. An opening-closing body drive motor configured to open and close an opening-closing body included in a vehicle door between a fully closed position and a fully open position, the opening-closing body drive motor comprising:

a motor body; and a controller that operates the opening-closing body to open and close via the motor body based on operation of an opening-closing switch, wherein a set position is set between the fully closed position and the fully open position, a section from the set position to the fully closed position defines a first section, a section located closer to the fully open position than the first section defines a second section, the controller is configured to execute low speed operation control and automatic operation control, the low speed operation control sets an operation speed of an opening-closing operation of the opening-closing body based on operation of the opening-closing switch to be lower in the first section than in the second section, the automatic operation control operates the opening-closing body to open when the opening-closing body is located in the first section based on detection that the vehicle door is open and operates the opening-closing body to close based on a subsequent detection that the vehicle door is closed, and in at least one of the opening operation and the closing operation of the opening-closing body based on control of the controller, the operation speed of the opening-closing body under the automatic operation control is set to be higher than the operation speed of the opening-closing body under the low speed operation control.

6. The opening-closing body drive motor according to claim 5, wherein in both of the opening operation and the closing operation of the opening-closing body based on control of the controller, the operation speed of the opening-closing body under the automatic operation control is set to be higher than the operation speed of the opening-closing body under the low speed operation control.

7. The opening-closing body drive motor according to claim 5, wherein in only the opening operation of the opening-closing body based on control of the controller, the operation speed of the opening-closing body under the automatic operation control is set to be higher than the operation speed of the opening-closing body under the low speed operation control.

* * * * *